UNITED STATES PATENT OFFICE.

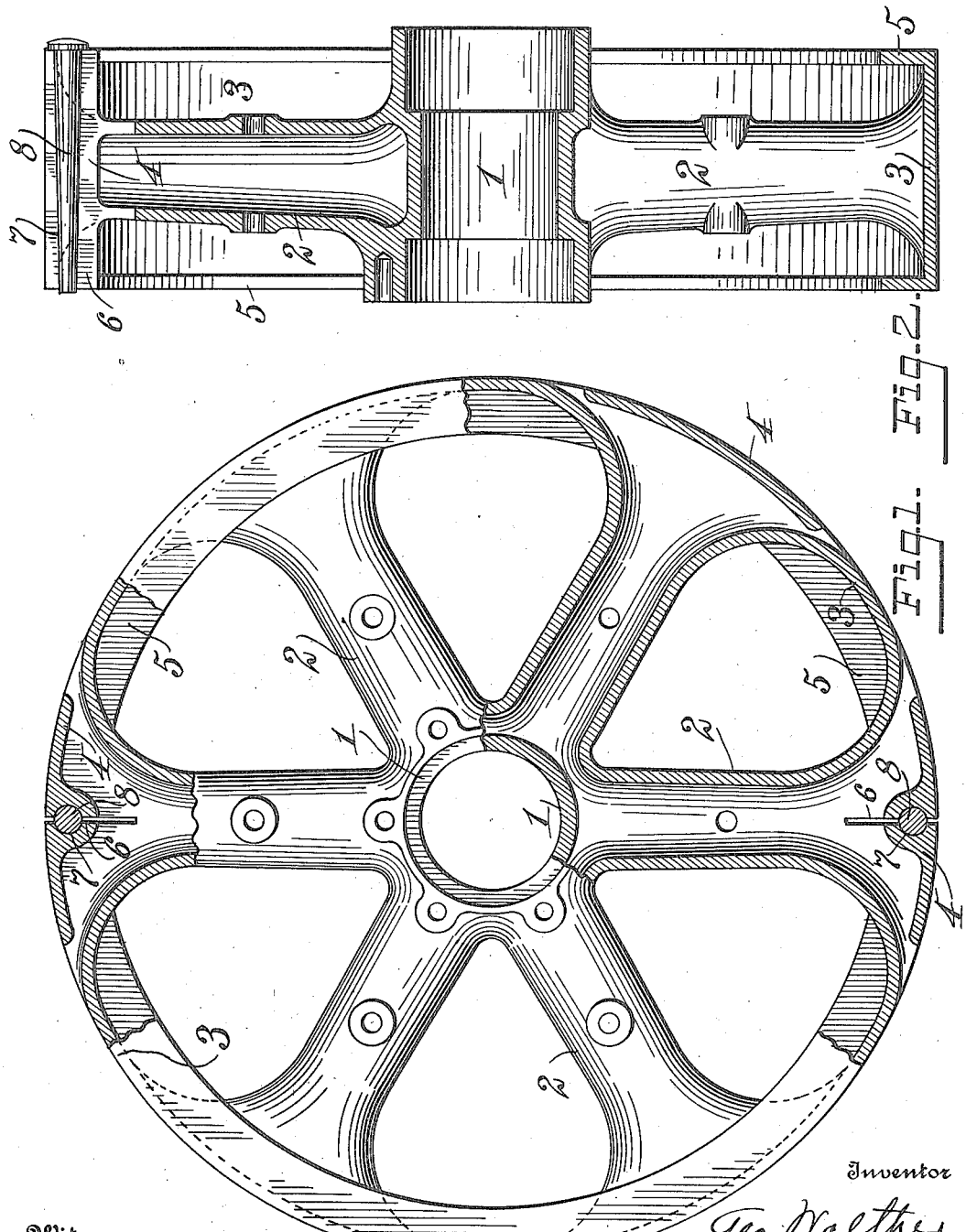

GEORGE WALTHER, OF DAYTON, OHIO.

METAL VEHICLE-WHEEL.

1,184,797.　　　　Specification of Letters Patent.　　Patented May 30, 1916.

Application filed June 26, 1915. Serial No. 36,458.

*To all whom it may concern:*

Be it known that I, GEORGE WALTHER, a citizen of the United States, residing at Dayton, in the county of Montgomery and State of Ohio, have invented certain new and useful Improvements in Metal Vehicle-Wheels; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to new and useful improvements in vehicle wheels wholly constructed of metal.

The object of the said invention is to construct such a wheel with a capacity for expanding to hold the tire firmly in position and a capacity for contracting and to thereby break the connection between the tire and the periphery of the wheel rim usually caused by rust, and to thus permit the removal of the tire when necessary.

In the accompanying drawings, Figure 1 is an elevation partly in section of a metal wheel made in accordance with my invention, and Fig. 2 is a cross sectional view thereof.

The wheel is formed of metal, the hub 1, spokes 2 and rim 3 being integrally united. At two or more points where the spokes run into and form the rim, bridges 4 span the space from side to side and integrally unite with the inturned flange 5. Two or more of these bridges 4 are slotted as at 6 said slots extending into the spokes a suitable distance to allow for some expansion and contraction of the rim of the wheel. Each slot 6 is enlarged in the form of a tapered opening 7 which extends through the bridge 4 and receives a tapered expansion pin 8. The insertion of this pin causes a sufficient expansion of the rim of the wheel to rigidly bind the periphery of the rim to the tire. It is essential that the slots 6 shall be arranged in the wheel rim at points opposite the spokes in order that the wheel shall not be weakened thereby. Since the driving of the pins 8 into position causes a definite expansion of the wheel rim to tighten the tire, it follows that a withdrawal of said pins will likewise permit of a sufficient contraction of the rim to break the rust between the rim and tire and to thereby permit of a ready removal of the tire.

Having described my invention, I claim.

A metal wheel, the hub, spokes and rim of which are integrally united, said spokes being hollow and running into the rim in uniformly broad curvatures or sweeps, the portions of the rim opposite the spokes being spanned by integral bridges two opposite ones of which are enlarged at their middle portions and slotted, said slots extending into the spokes and said enlarged parts of said bridges being provided with transverse tapered openings, and tapered pins adapted to penetrate said openings, said pins serving to expand the rim of the wheel when inserted and to permit said rim to contract when removed, substantially as specified.

In testimony whereof I affix my signature.

GEORGE WALTHER.